United States Patent [19]

Carré et al.

[11] 4,334,712
[45] Jun. 15, 1982

[54] BRAKING COMPENSATOR DEPENDENT ON THE DECELERATION

[75] Inventors: Jean-Jacques Carré, Montreuil; Guy Meynier, Bondy, both of France

[73] Assignee: Societe Anonyme D.B.A., Paris, France

[21] Appl. No.: 80,810

[22] Filed: Oct. 1, 1979

[30] Foreign Application Priority Data

Sep. 28, 1978 [FR] France .................. 78 28550

[51] Int. Cl.³ .................................. B60T 8/26
[52] U.S. Cl. .................................. 303/24 C
[58] Field of Search .............. 303/6 C, 24 R, 24 C, 303/24 F; 188/349

[56] References Cited

U.S. PATENT DOCUMENTS 3,881,786  5/1975  Hayes ..................... 303/6 C X
3,944,292  3/1976  Doi et al. ............... 303/24 C
4,125,291  11/1978  Nogami .

FOREIGN PATENT DOCUMENTS 1938875  12/1933  Fed. Rep. of Germany .
2736052   5/1978  Fed. Rep. of Germany .
2736095   6/1978  Fed. Rep. of Germany .
2130048   9/1938  France .
2340229   2/1944  France .
2356543   8/1944  France .
1542039  10/1968  France .
2350232   1/1977  France .
1240223   7/1971  United Kingdom .
1248496  10/1971  United Kingdom .
1437415   5/1976  United Kingdom .
1471826   4/1977  United Kingdom .
1479704   7/1977  United Kingdom .

Primary Examiner—Duane A. Reger
Attorney, Agent, or Firm—Paul David Schoenle; Ken C. Decker

[57] ABSTRACT

The Compensator is of the type in which the cut-off point is defined by measurement of the pressure of the brake liquid trapped in a pilot chamber when the latter is isolated by closure of a valve associated with a mass which is responsive to the deceleration of the vehicle and which is urged by resilient means towards a position corresponding to the opening of said valve.

It is characterized in that it comprises means responsive to the braking pressure, which modify the calibration of said resilient means as a function of said pressure.

The braking compensator is applicable to braking systems for motor vehicles.

6 Claims, 3 Drawing Figures

BRAKING COMPENSATOR DEPENDENT ON THE DECELERATION

The invention relates to braking compensators and more particularly to a compensator dependent on the deceleration of the vehicle.

The compensator in accordance with the invention is of the type in which the cut-off point is defined by measurement of the pressure of the brake liquid trapped in a pilot chamber when the latter is isolated by closure of a valve associated with a mass which is responsive to the deceleration of the vehicle and which is urged by resilient means toward a position corresponding to the opening of said valve.

It is characterized in that it comprises means responsive to the braking pressure, which modify the calibration of said resilient means as a function of said pressure.

It will be understood that, with such a characteristic, the higher the pressure in the braking circuit upstream (or downstream) the compensator the more strongly being the deceleration-responsive mass of the compensator urged towards the position corresponding to the opening of the valve, the point of cut-off of the compensator will be reached for a deceleration which is variable as a function of the braking pressure and consequently of the load on the vehicle without there being any need to provide a coupling member between the compensator and the suspension of the vehicle in a known manner.

The invention will now be described with reference to the accompanying drawings wherein.

Figure 1:
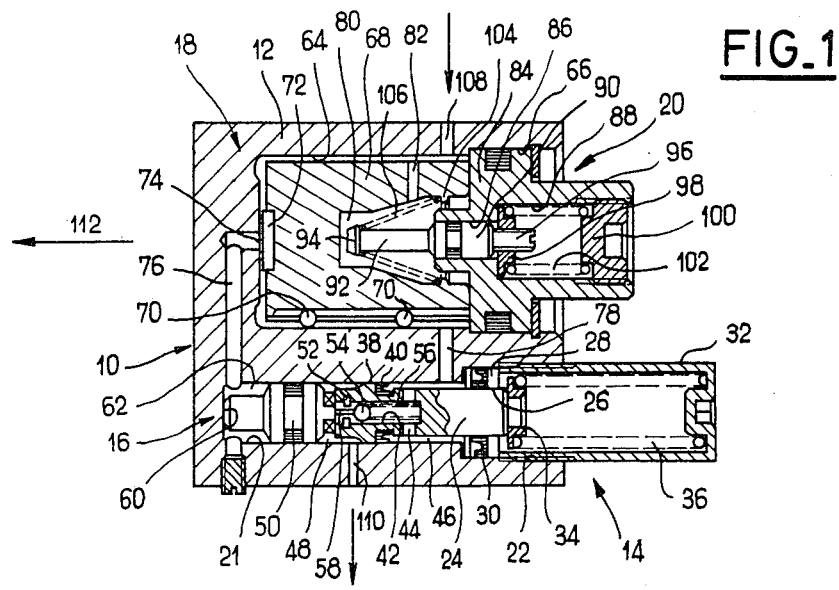
FIG. 1 is a longitudinal section of a braking compensator according to the invention.

Referring to FIG. 1, the braking compensator dependent on the deceleration and the load, designated by the general reference 10 comprises a housing 12 in which are arranged in parallel: a compensator 14 and a pilot system 16 on the one hand, and on the other hand a decelerometer 18 and a manometer 20.

The compensator 14 and the pilot system 16 are arranged in a common blind stepped bore consisting of two coaxial portions 21 and 22. A stepped piston 24 is slidably mounted in the portion 21 of the bore and passes through an aperture 26 arranged in a ring 28 which is mounted in the bottom of the portion 22 of the bore and equipped with a seal 30 which ensures oiltightness both between the piston and the ring and between the ring and the bore. The right hand end of the portion 22 of the bore (looking at FIG. 1) receives a stopper 32 screwed into a thread provided for this purpose. The right hand end of the piston 24 has a flange 34. Between the flange 34 and the end of the stopper 32 is interposed a spring 36. The left hand end of the piston 24 cooperates with the portion 21 of the bore by means of a bearing surface 38. A seal 40 is arranged between the piston 24 and the bore. An axial aperture 42 and a radial aperture 44 arranged in the piston 24 put into communication two chambers 46 and 48. The chamber 46 bounded by the piston 24, the bore and the two seals 30 and 40 will be called the inlet chamber, the chamber 48 bounded by the piston 24, the bore, the seal 40 and a pilot piston 50 will be called the outlet chamber. In the axial aperture 42 are mounted from left to right an annular seat 52 and a ball 54 which cooperate with one another to form a valve, and a spring 56 which urges the ball 54 towards its seat 52. The pilot piston 50 is mounted with a sliding seal in the end of the bore at the left of the piston 24. It includes a pushrod 58 which passes through the seat 52 in order to push the ball 54 away from the latter when, at rest, the spring 36 pushes back the piston 24 into abutment against the pilot piston 50 and the latter into abutment against the end 60 of the bore. The piston 50, the bores 21-22 and the end 60 of the latter define a pilot chamber 62.

The decelerometer 18 and the manometer 20 are arranged in a common bore consisting of two coaxial portions 64 and 66. The decelerometer 18 consists of a cylindrical mass 68 which slides in the portion 64 of the bore by means of roller bearings 70 arranged at 120° along three generatrices. The left-hand face of the mass 68 includes a valve member 72 capable of closing an orifice 74 arranged in the end of the bore. The orifice 74 communicates with the pilot chamber 62 by means of a passage 76. The bore 64-66 communicates with the inlet chamber 46 by means of a passage 78. The mass 68 is recessed at 80 and a passage 82 puts into communication with the recess 80 the annular space lying between the mass 68 and the bore 64.

The manometer 20 comprises a stopper 84 sealingly mounted in the bore 66. In the stopper 84 are drilled two coaxial bores 86 and 88. A piston 90 is mounted with a sliding seal in the bore 86; it includes on the one hand an extension 92 which extends inside the recess 80 and ends in a flange 94, and on the other hand a threaded extension 96 screwed into a disc 98 located in the bore 88. The bore 88 is closed off by a screwed plug 100 equiped with an orifice for connection to the atmosphere. A spring 102 is interposed between the plug 100 and the disc 98. The mass 68 includes an annular shoulder 104 directed towards the interior of the recess 80. A spring 106 of conical shape is interposed between the flange 94 and the shoulder 104. This spring returns the mass 68 into abutment against the stopper 84, separating the valve member 72 from the orifice 74.

An inlet orifice 108 puts the bore 64 into communication with a master cylinder (not shown) and an orifice 110 puts the outlet chamber 48 into communication with the rear brakes.

The compensator which has just been described is fastened onto the vehicle so that the axis of movement of the mass 68 is substantially horizontal, with the valve member 72 located towards the front of the vehicle. It operates in the following manner: if the vehicle is assumed to be stationary and no braking pressure is applied, the components of the compensator occupy the positions in which they are represented in FIG. 1: the piston 24 in abutment against the pilot piston 50, which in turn abuts against the end of the bore 60, under the action of the spring 36; the mass 68 in abutment against the stopper 84 and the piston 90 pushed back towards the left by the spring 102 as far as the position in which the disc 98 comes into abutment against the end of the bore 88.

The vehicle being still stationary, a brake application is effected. The pressure created in the master cylinder is transmitted to the braking circuit through the orifice 108. This pressure is transmitted through the passage 82 towards the recess 80, through the passage 78 towards the inlet chamber 46 and through the passage 76 towards the pilot chamber 62. The ball 54 being separated from its seat 52, this inlet pressure $P_E$ is likewise transmitted to the outlet chamber 48 through the passages 44 and 42 and then to the brakes through the orifice 110. Up to a predetermined pressure $P_O$ the piston 24 remains stationary, the force caused by the pressure acting upon the area of the piston arranged in the aperture 26, of area $S_2$, remaining less than the force $F_1$ from the spring 36; the inlet pressure $P_E$ and outlet pressure $P_S$ are hence equal (see FIG. 2, segment OA). If this pressure $P_O$ is exceeded, the piston 24 moves towards the right against the spring 36 and the ball 54 comes to be applied against the seat 52.

Figure 2:
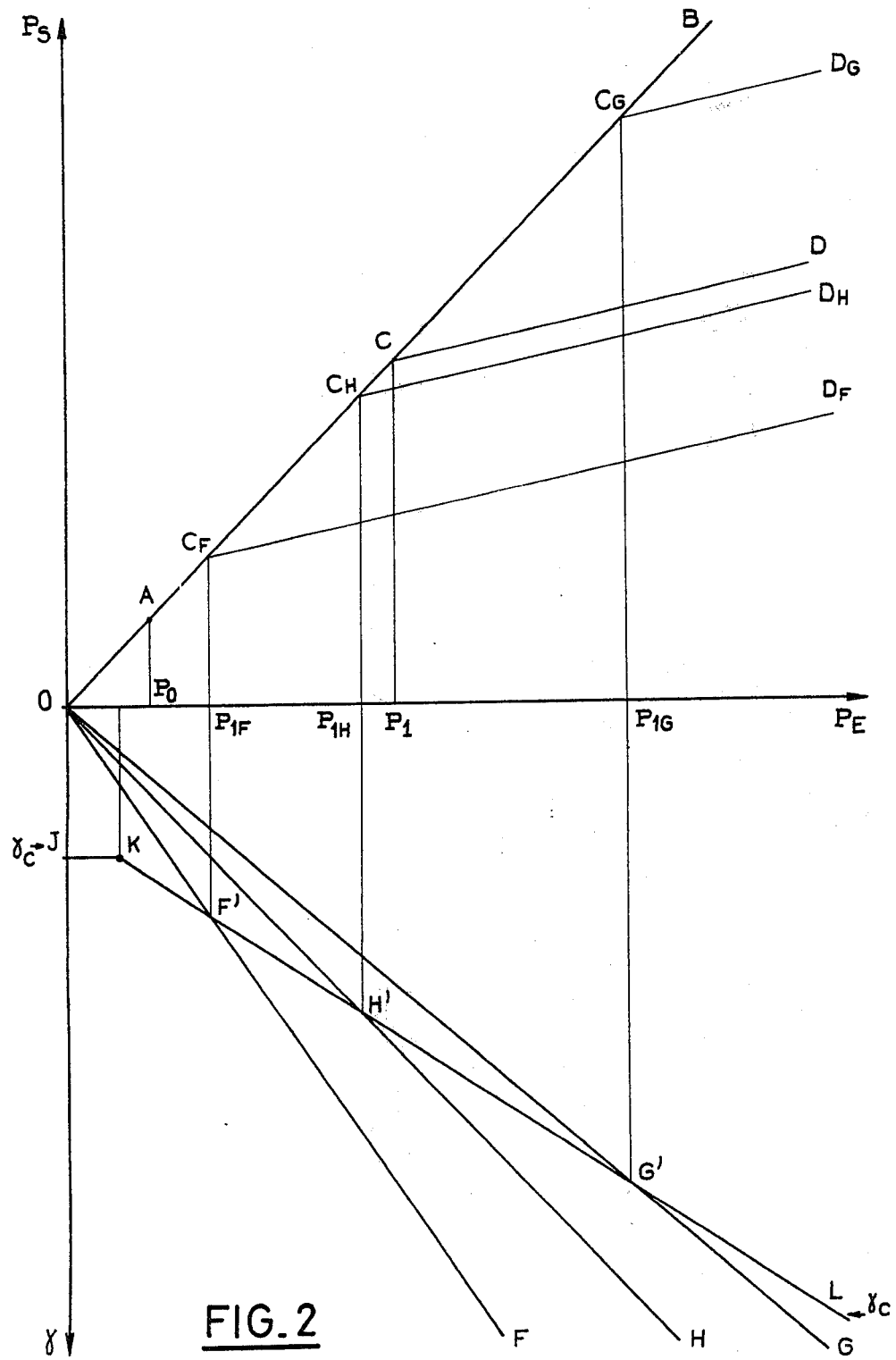
FIG. 2 represents the relationships between the pressures at the input and at the output of the compensator of FIG. 1 in various cases of operation as well as the relationships between the deceleration and these same pressures.

The closure of the communication between the inlet chamber 46 and the outlet chamber 48 prevents increase of pressure in the outlet chamber 48. Consequently, the pilot piston 50 being from now on no longer subjected to identical pressures, moves towards the right, the push rod 58 separating the ball from its seat 52, which re-establishes communication between the inlet chamber 46 and the outlet chamber 48. The result is that the outlet pressure $P_S$ and the inlet pressure $P_E$ are always equal (FIG. 2, straight line AB).

If when the pressure $P_E$ has reached a value $P_{1'}$ the mass 68 is moved leftwardly against the force of spring 106, the valve member 72 comes to shut off the orifice 74. The volume bounded by the passage 76 and the pilot chamber 62 can no longer vary and the pilot piston 50 consequently remains stationary. If the inlet pressure $P_E$ is increased, the piston 24 is displaced against the spring 36 and the seat 52 is displaced, coming close to the ball 54. There ensues a control of the fluid flow between the ball 54 and its seat 52 which is typical of the operation of a compensator. The development of the outlet pressure $P_S$ may be calculated as follows: if the internal area of the seat 52 is called $S_3$ and the area of the portion of bore 21 reduced by the area $S_3$ above is called $S_1$, the ball is subjected to a force $P_E \cdot S_3$ directed towards the left and to a force $P_S \cdot S_3$ directed towards the right and hence it transmits overall to its seat 52 and hence to the piston 24 a force $(P_E - P_S)S_3$ directed towards the left. The piston 24 is further-more subjected on the one hand to two other forces directed towards the left, namely: the force $F_1$ from the spring 36 and a force $P_E \cdot S_1$ resulting from the action of the inlet pressure on the area $S_1$ above, and on the other hand to two forces directed towards the right, namely: a force $P_E \cdot S_2$ resulting from the action of the inlet pressure against the area $S_2$ and a force $P_S \cdot S_1$ resulting from the action from the outlet pressure on the area $S_1$ above. Hence the equilibrim of the piston is written:

$$F_1 + P_E S_1 + (P_E - P_S)S_3 = P_E S_2 + P_S S_1$$

or else $P_S = P_E(S_1 + S_3 - S_2)/(S_1 + S_3) + F_1/(S_1 + S_3)$

Hence the outlet pressure $P_S$ increases less quickly than $P_E$ under the action of the braking compensator 14.

The relationships between $P_S$ and $P_E$ is illustrated in FIG. 2 by the line OCD. The pressure $P_1$ above which $P_S$ becomes less than $P_E$ is called the cut-off pressure.

The role of the decelerometer 18 and of the manometer 20 is to effect the closure of the orifice 74 and as has just been seen, to initiate the operation of the compensator 14 by fixing of the pilot piston 50, beyond a variable cut-off pressure as explained below: The vehicle is now assumed to move in the direction of the arrow 112 (FIG. 1). Depending upon its load, the deceleration $\gamma$ which would be obtained by applying the input pressure $P_E$ to the brakes is practically proportional to this pressure and this relationships is illustrated diagramatically in FIG. 2 by the straight lines OF (vehicle empty), OG (vehicle loaded to the maximum) or OH (vehicle moderately loaded).

Upon application of a braking pressure $P_E$ the decelerometer and the manometer are urged as follows: the piston 90 (if one neglects the force of the spring 106) is urged towards the left by the force $F_2$ of the spring 102 and towards the right by the force $P_E S_4$ produced from the pressure $P_E$ by the area $S_4$ of the section 86. When this product $P_E S_4$ becomes greater than $F_2$ the piston 90 is moved towards the right with an amplitude $$x = (P_E S_4 - F_2)/k_2$$

$k_2$ being the stiffness of the spring 102. This movement x of the piston 90 has the effect of compressing the spring 106. If the stiffness of the latter is $k_3$ the restoring force which it then exerts on the mass 68 becomes $$F = F_3 + k_3 x \text{ or else } F = (k_3/k_2)(P_E S_4 - F_2)$$

where $F_3$ is the calibration force of the spring 106. Further-more under the effect of the deceleration $\gamma$ the mass 68, of mass M, is subjected to a force due to inertia equal to $M\gamma$. Hence one observes that as long as $M\gamma$ is less than F the mass 68 remains stationary and the outlet pressure $P_S$ is equal to $P_E$. For each value of $P_E$ there exists a deceleration called the cut-off deceleration $\gamma_c$ above which $M\gamma$ becomes greater than F, the mass 68 then moving in order to close the orifice 74 and initiate the operation of the compensator. For $P_E$ less than or equal to $F_2/S_4$, $\gamma_c$ is equal to $F_3/M$ and for $P_E$ greater than or equal to $F_2/S_4$ $$\gamma_c = (F_3/M) + (k_3/k_2)(P_E S_4 - F_2).$$

These relationships between $\gamma_c$ and $P_E$ are represented in FIG. 2 by the segment JK and the straight line KL. Consequently for each state of loading of the vehicle there exists a cut-off pressure $P_1 F$ (or $P_1 G$ or $P_1 H$) defined by the point of intersection F' or (G' or H') between the straight line OF (or OG or OH) and the curve JKL and it may be observed that the more loaded the vehicle the greater the deceleration of the vehicle corresponding with this cut-off point, which is the most important feature of the operation of such a corrector; the adhesion of the rear wheels being better when the vehicle is loaded it is therefore possible to brake a vehicle efficiently by taking its load into account.

Figure 3:
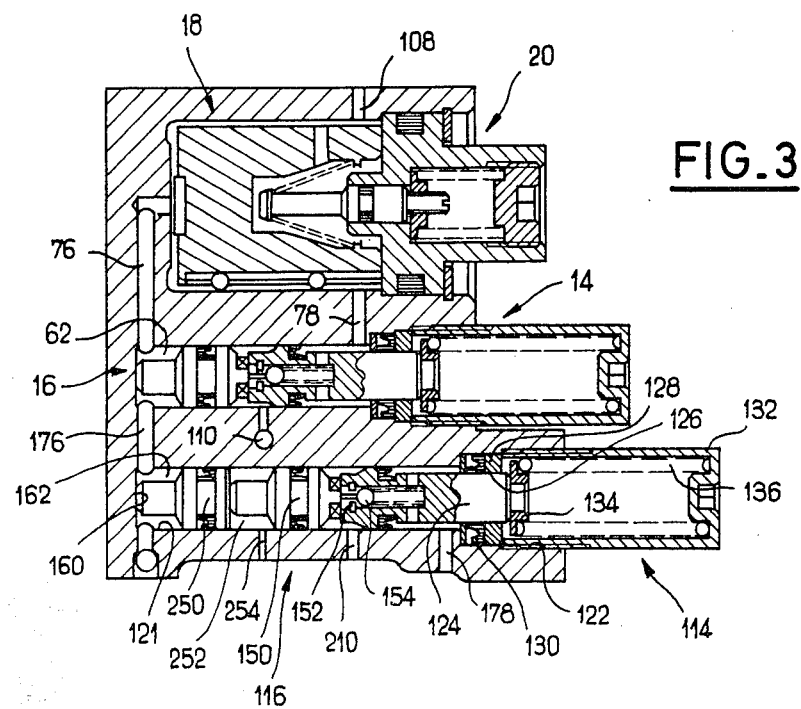
FIG. 3 is a longitudinal section of a braking compensator according to the invention for a double braking circuit.

FIG. 3 represents a second embodiment of the compensator in accordance with the invention, intended more precisely for braking systems in which two brakes are fed from two different sources of pressure as, for example, in the braking systems known as "X".

In this embodiment is found besides the compensator 14, the pilot system 16, the decelerometer 18 and the manometer 20, a second compensator 114 the components of which are identical with those of the compensator 14 and carry the same reference numbers increased by 100, a second pilot system 116 identical with the pilot system 16 and a buffer piston 250.

The buffer piston 250 is mounted with a sliding seal in the end of the bore 121 between the left hand end of the piston 150 and the end 160 of the bore. The passage 76 communicating with the pilot chamber 62 is extended by a passage 176 communicating with a second pilot chamber 162 located at the left of the buffer piston 250.

The system receives two inlet pressures $P_{EG}$ and $P_{ED'}$ the one through the orifice 108 and the other through the orifice 178, and transmits two outlet pressures $P_{SG}$ and $P_{SD}$ (the one through the orifice 110 and the other through the orifice 210) to the left and right rear brake motors respectively.

The examination of the relationships between the inlet pressures and outlet pressures as a function of the deceleration, carried out above in relation to the compensator of FIG. 1, applies in an identical way to this second compensator, the assembly formed by the pistons 150 and 250 moving as a whole.

It may be observed that this embodiment enables the two compensators to be controlled from the same manometer 20-decelerometer 18 assembly.

The special feature connected with the presence of the buffer piston 250 is to separate the two braking circuits by a chamber 252 connected to atmosphere through an orifice 254. That is, in the event of deterioration of one of the two seals associated with the pistons 150 and 250, the independence of the two braking circuits is maintained on the one hand, and on the other hand this deterioration may be detected thanks to a leakage of brake liquid through the orifice 254.

What is claimed is:

1. For an automotive vehicle, a brake pressure compensator of the type having a housing defining an inlet receiving pressurized fluid from a source thereof and an outlet communicating pressurized fluid to a vehicle brake, a flow path defined within said housing communicating said inlet and said outlet, a pressure responsive valve member in a first position opening said flow path and in a second position closing said flow path, first resilient means for yieldably biasing said pressure responsive valve member to said first position, said pressure responsive valve member moving to said second position in response to a determined fluid pressure and shuttling between said first and said second positions in response to the pressure of said pressurized fluid at said inlet increasing to a value greater than said determined fluid pressure to communicate a proportion of said increasing fluid pressure to said outlet, and means for varying said determined fluid pressure in response to deceleration of said vehicle, the improvement therein comprising said varying means including a movable pressure responsive pilot communicating with said flow path between said inlet and said pressure responsive valve member and also communicating with said flow path between said pressure responsive valve member and said outlet, said pilot piston movably cooperating with said valve member to open communication between said inlet and said outlet in response to a fluid pressure differential therebetween.

2. The invention of claim 1 wherein said pilot piston communicates with said flow path between said inlet and said pressure responsive valve means via a passage, said varying means including a deceleration responsive valve member in a first location opening said passage and in a second location closing said passage to substantially immobilize said pilot piston, second resilient means for yieldably biasing said deceleration responsive valve means to said first location, a manometer piston movable in said housing communicating with pressurized fluid at said inlet and with ambient pressure, and said manometer piston cooperating with said second resilient means to vary the resilient bias exerted by the latter on said deceleration responsive valve member in response to the pressure level of said pressurized fluid.

3. The invention of claim 1 or 2 wherein said pressure responsive valve member includes an elongate stepped piston defining an axial bore therein defining a part of said flow path and opening axially on one end of said stepped piston, an annular valve seat carried within said stepped piston circumscribing said axial bore, and a valve element yieldably biased into sealing engagement with said valve seat to close said flow path, said stepped piston moving axially to engage said valve element with an axially extending push rod which unseats said valve element to define said first position for said pressure responsive valve member, and said stepped piston moving away from said push rod to engage said valve seat with said valve element to define said second position for said pressure responsive valve member.

4. The invention of claim 3, wherein said pilot piston is coaxially aligned with and movable relative to said stepped piston, said pilot piston carrying said push rod and moving in follow-up relationship with said stepped piston to unseat said valve element in response to said pressure differential.

5. A fluid pressure and deceleration responsive brake pressure compensator comprising:
a body defining a pair of bores therein, said body defining an inlet communicating pressurized fluid from a source thereof into one of said pair of bores; an outlet communicating pressurized fluid from the other of said pair of bores to a brake; and a first passage interconnecting said pair of bores;
a pilot piston movably and sealingly disposed in said other bore between an end wall of the latter and said outlet to define a pilot chamber adjacent said end wall;
a second passage communicating said pilot chamber with said one bore;
a pressure responsive valve member movably received in said other bore and sealingly cooperating with said housing between said first passage and said outlet to define an inlet chamber communicating with the former and an outlet chamber communicating with the latter and with said pilot piston, said pressure responsive valve member cooperating with said pilot piston in a first relative position therebetween to open communication between said inlet chamber and said outlet chamber;
first resilient means for yieldably biasing said pressure responsive valve member into said first relative position with said pilot piston and biasing the latter into engagement with said end wall;
said pressure responsive valve member shifting to a second position relative to said pilot piston in response to a determined fluid pressure to close communication between said inlet chamber and said outlet chamber to create a pressure differential therebetween, said pilot piston moving in follow-up relationship with said pressure responsive valve member in said first relative position therewith in response to said pressure differential to reopen fluid communication between said inlet chamber and said outlet chamber;
a deceleration and fluid pressure responsive valve member disposed in said one bore in a first position opening fluid communication between said inlet chamber and said pilot chamber via said one bore and said first and second passages, said deceleration responsive valve member shifting to a second position in response to a determined deceleration and fluid pressure to close fluid communication between said inlet chamber and said outlet chamber to substantially immobilize said pilot piston, whereby said pressure responsive valve member is shiftable to said second piston relative said pilot piston in response to fluid pressure increasing to a value greater than said determined fluid pressure.

6. The invention of claim 5 wherein said deceleration and pressure responsive valve member includes a manometer piston communicating with said pressurized fluid and with ambient pressure and moving in response to the difference therebetween, a mass movable within said housing in response to deceleration to close fluid communication between said inlet chamber and said outlet chamber, and resilient means extending between said manometer piston and said mass for yieldably biasing the latter to a position opening fluid communication between said inlet chamber and said outlet chamber in opposition to said deceleration, whereby movement of said manometer piston in response to fluid pressure varies the resilient bias applied to said mass.

* * * * *